United States Patent
Unsleber et al.

(10) Patent No.: US 6,230,865 B1
(45) Date of Patent: May 15, 2001

(54) HUB FOR FRICTION CLUTCH

(75) Inventors: Elmar Unsleber, Pfersdorf; Wilfried Pfeuffer, Werneck; Klaus Hofmann, Leutershausen, all of (DE)

(73) Assignee: Sachs Race Engineering GmbH, Schweinfurt (DE)

( * ) Notice: Subject to any disclaimer, the term of this patent is extended or adjusted under 35 U.S.C. 154(b) by 0 days.

(21) Appl. No.: 09/366,899

(22) Filed: Aug. 4, 1999

(30) Foreign Application Priority Data

Aug. 4, 1998 (DE) .............................................. 198 35 199

(51) Int. Cl.$^7$ ..................................................... F16D 13/52
(52) U.S. Cl. ...................... 192/70.2; 192/109 R
(58) Field of Search .......................... 192/70.27, 109 R, 192/70.11, 70.19, 70.2, 70.21

(56) References Cited

U.S. PATENT DOCUMENTS

| | | | |
|---|---|---|---|
| 4,846,326 | 7/1989 | Tilton et al. | ...................... 192/70.19 |
| 5,638,932 | 6/1997 | Mizukami | .......................... 192/70.12 |
| 5,975,269 | * 11/1999 | Kosumi et al. | ...................... 74/70.27 |
| 6,070,707 | * 6/2000 | Hofmann et al. | .............. 74/109 R X |

FOREIGN PATENT DOCUMENTS

| | | |
|---|---|---|
| 3321659 A1 | 12/1983 | (DE) . |
| 4003076 C2 | 8/1991 | (DE) . |
| 1407102 | 9/1975 | (GB) . |
| 2 300 679 | 11/1996 | (GB) . |
| 2 301 156 | 11/1996 | (GB) . |
| 2 313 421 | 11/1997 | (GB) . |
| WO91/14878 | 10/1991 | (WO) . |

* cited by examiner

*Primary Examiner*—Charles A Marmor
*Assistant Examiner*—Saul Rodriguez
(74) *Attorney, Agent, or Firm*—Cohen, Pontani, Lieberman & Pavane

(57) ABSTRACT

A hub for a friction clutch with at least one clutch plate. The hub includes at least one axial guide device for the clutch plates and at least one stop device, which at least in part merge into one another without interfaces. The stop device is arranged in the radially outer area of the axially continuous guide device.

14 Claims, 3 Drawing Sheets

HUB FOR FRICTION CLUTCH

BACKGROUND OF THE INVENTION

1. Field of the Invention

The present invention relates to friction clutches, and more particularly to a hub for a friction clutch with at least one clutch plate, which can be used in the drive train of a motor vehicle.

2. Description of the Related Art

Such a hub is known, for example, from U.S. Pat. No. 4,846,326. The hub of this clutch comprises a disk which is provided with axially projecting webs on both sides. A suitable mating contour in the clutch plates allows them to be pushed onto the hub centrally on both sides. The above-mentioned disc thus serves as a stop for the clutch plates. Since the webs have to be machined out of the solid material on both sides, the hub can only be produced with a high level of manufacturing outlay.

SUMMARY OF THE INVENTION

An object of the present invention is therefore to provide a hub for a friction clutch which is easier and less expensive to produce.

This and other objects of the invention are achieved by arranging a stop device on the hubs in the radially outer area of the guide devices and the toothing which is axially continuous. It is thus possible to produce the guide devices and the stop devices in a single working step and from one side, for example by milling or erosion, thus making it possible to reduce production time and outlay and therefore costs.

An advantageous configuration consists in at least two guide devices being of essentially identical form. Also, the use of a multiplicity of guide devices provides an advantage with regard to torque transmission, and prevents the clutch plate(s) from becoming tilted. The guide devices are preferably arranged on the outer circumference of the hub in the form of a circle around the axis of rotation, and are distributed around the axis at equal angular distances.

Furthermore, it may be advantageous to provide at least two identical stop devices. If necessary, the load-bearing capacity of the hub can be increased by using a multiplicity of stop devices. The stop devices are preferably arranged directly in the radially outer area of the guide devices. For reasons of symmetry, an annular arrangement or an arrangement at equal angular distances may be provided. In one embodiment, the stop device comprises a continuous ring.

According to an embodiment of the invention, the hub is produced using, a hub blank with a continuously encircling collar for the stop device. By removing the areas radially inside the collar, the guide device and the stop device are simultaneously manufactured on both sides. In this case, and in order to produce an adjacent guide device or stop device without the tool having to be removed from the blank, it is advantageous to cut through the collar or a guide device during machining. This is advantageous in particular for manufacturing by wire EDM.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Preferred embodiments are explained below with reference to drawings, in which, in detail.

DETAILED DESCRIPTION OF THE PRESENTLY PREFERRED EMBODIMENTS

Figure 1A:
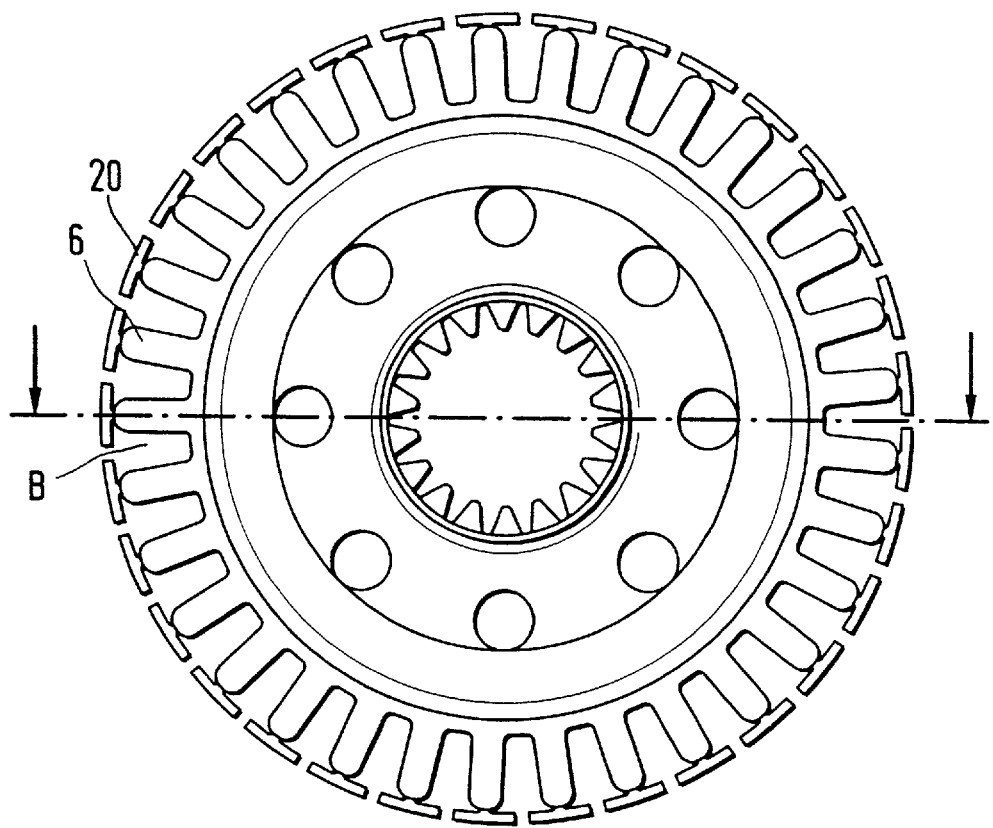
FIG. 1a is a front view of the hub with stop devices according to an embodiment of the invention.
Figure 1B:
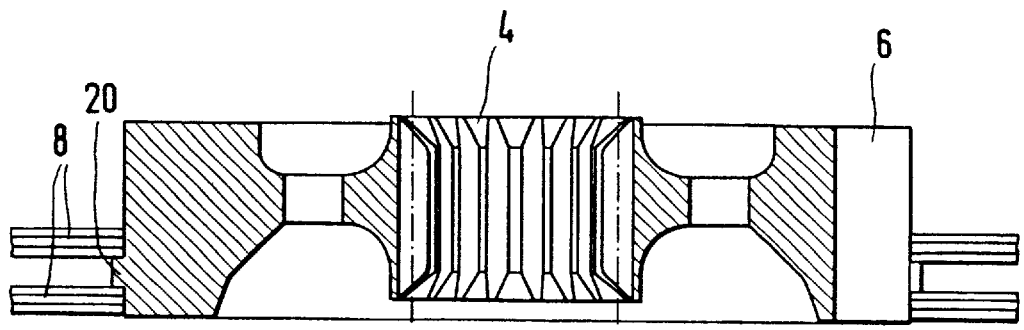
FIG. 1b is a cross-sectional view of the hub of FIG. 1a taken along line I—I.

Referring to FIGS. 1a and 1b, in addition to the internal toothing 4 which is used to mount the hub in a rotationally fixed but axially displaceable manner on a transmission shaft (not shown), the hub has external toothing which serves as a guide device 6. The hub is provided with a plurality of holes 5 which are preferably arranged at equal angular distances.

Two different embodiments of the guide devices and/or the stop devices are to be described in the following text. In the embodiments illustrated in FIGS. 1a and 1b, and 2a and 2b, axially continuous guide devices 6 which merge into stop devices 20 without using interfaces. The stop devices 20 are arranged at the outer circumference on the guide devices 6. Both embodiments use a multiplicity of guide devices and stop devices which are essentially identical and are arranged in the form of a circle on the outer circumference.

Figure 2A:
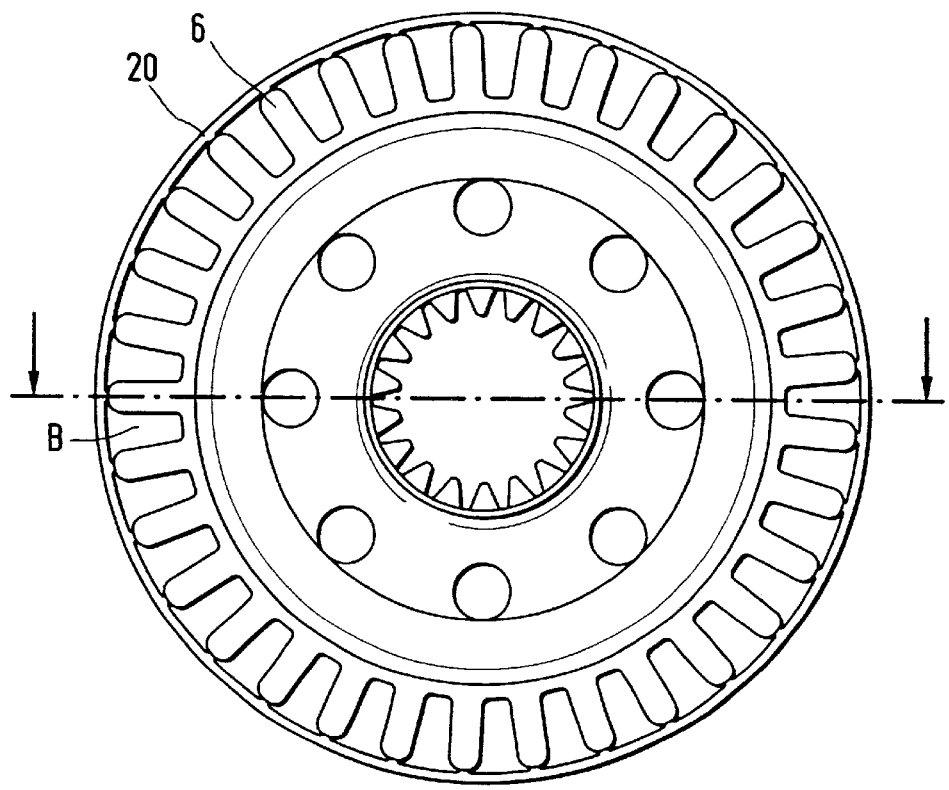
FIG. 2a is a front view of the hub with an annular stop device according to another embodiment of the invention.
Figure 2B:
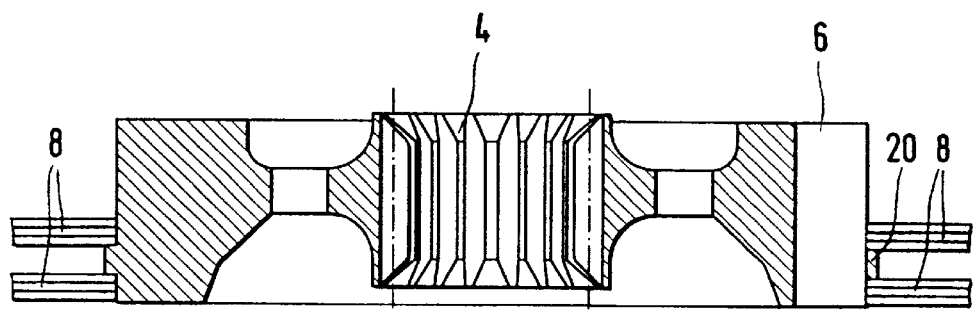
FIG. 2b is a cross-sectional view of the hub of FIG. 2a taken along line II—II.

FIGS. 1a & 1b show an embodiment which has a multiplicity of stop devices 20 which are arranged on the outer circumference to substantially form a ring on the guide devices 6. The embodiment depicted in FIGS. 2a and 2b shows stop devices 20 formed as a continuous ring on the outer circumference.

In the fully assembled clutch, clutch plates 8 are guided on the guide devices 6 such that they are rotationally fixed but axially displaceable. This is achieved by means of corresponding recesses around the center of rotation of the clutch plates 8. The embodiments presented here each have two clutch plates 8, one arranged on each side of the stop device 20. In operation, a further clutch plate 21, which is connected to the torque input part, is clamped between the two clutch plates 8. The stop device 20 is thus responsible for the position of the hub on the transmission shaft in relation to the clutch plate 21.

In addition to the two embodiments shown, all possible combinations are, of course, conceivable. The hubs described above are preferably produced as follows.

Firstly, a hub blank which already has a continuous encircling collar for the later stop device is produced, for example by turning. In a second step, all the areas B (FIGS. 1a and 2a) which are situated radially inside the collar are then removed from the hub blank. In this way, the axially continuous guide device 6 and the stop device 20 can be manufactured simultaneously. In particular, both sides of the hub are provided with guide devices and stop devices in the same working step.

Figure 3:
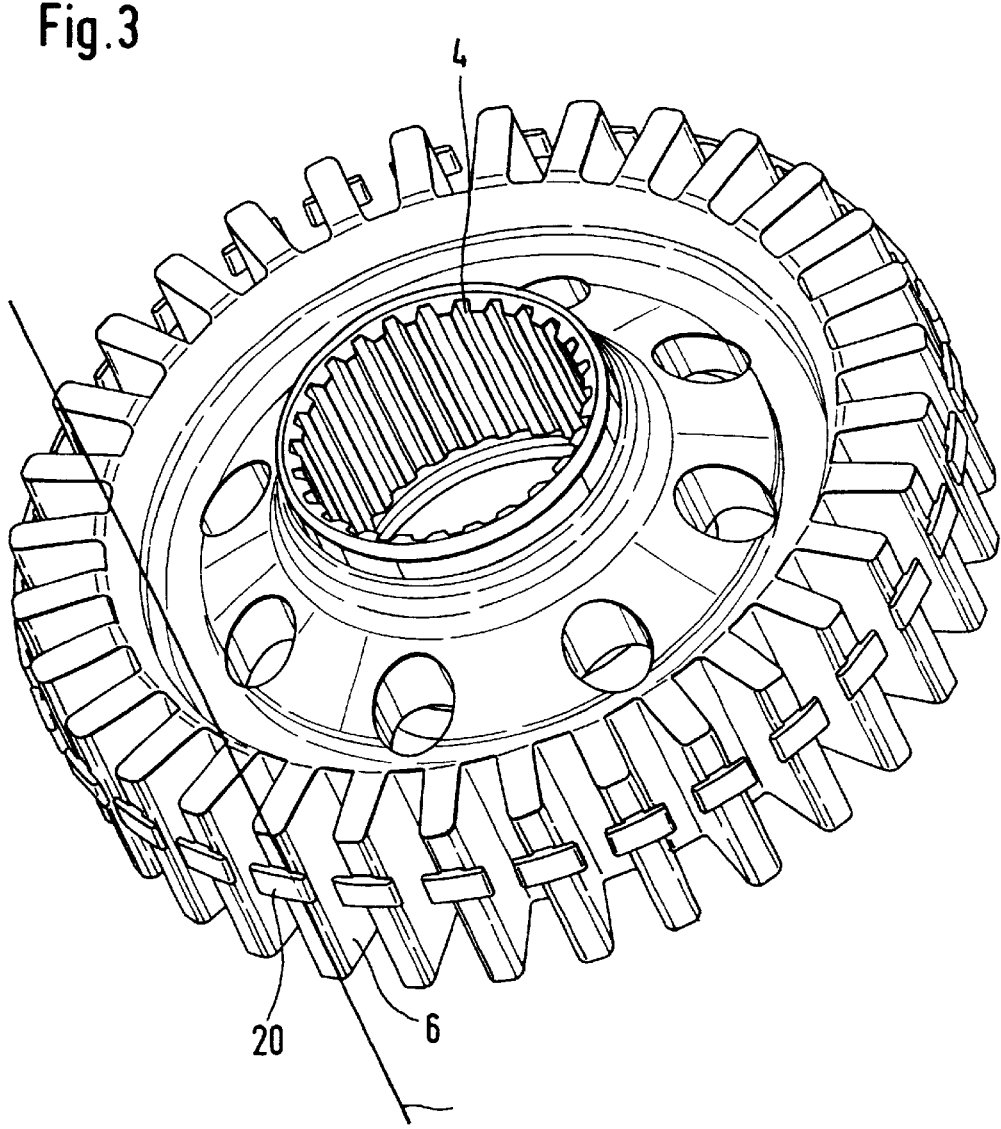
FIG. 3 is a perspective view depicting the production of the hub in FIG. 1.

If the preferred wire EDM process (FIG. 3) is used to remove the areas B, it is possible, for example, to manufacture the guide device and stop device of the hub shown in FIG. 2 by cutting the individual areas B out of the hub blank using one wire for each area. For this purpose, the blank must first be drilled through within the areas B, in order to produce a guide for the wire. If a multiplicity of guide devices are envisaged, it may be advantageous also to cut through the collar or the guide device 6 while removing the area B, in order then to produce the adjacent guide device using the process described above. In this case, the guide devices 6 and stop devices 20 can be produced in a single working step. This eliminates the need to guide the erosion wire through a number of times, for which reason in this case at most one drilled hole within the area B which is to be cut out first is sufficient. If, as shown in FIGS. 1a and 3, the stop device 20 is cut through during wire EDM, the wire can be introduced into the hub blank from the outer circumference. Drilled holes are therefore not required.

The invention is not limited by the embodiments described above which are presented as examples only but can be modified in various ways within the scope of protection defined by the appended patent claims.

We claim:

1. A one-piece hub for a friction clutch having at least one clutch plate, comprising:
   - at least one axially continuous axial guide device for the at least one clutch plate; and
   - at least one stop device arranged at a radially outer end of said at least one guide device and being at least partially merged with said at least one axial guide device without interfaces.

2. The hub in accordance with claim 1, comprising at least two substantially identical guide devices.

3. The hub in accordance with claim 1, comprising a plurality of guide devices.

4. The hub in accordance with claim 3, wherein said plurality of guide devices are arranged around an axis of rotation of the hub at equal angular distances from one another.

5. The hub in accordance with claim 4, wherein said plurality of guide devices are arranged on an outer circumference of the hub and thereby form a circle around the axis of rotation.

6. The hub in accordance with claim 1, comprising at least two substantially identical stop devices.

7. The hub in accordance with claim 1, comprising a plurality of stop devices.

8. The hub in accordance with claim 7, wherein said stop devices are arranged on a radially outer area of said guide devices.

9. The hub in accordance with claim 7, wherein the stop devices are arranged in the form of a ring in a radially outer area of said guide devices.

10. The hub in accordance with claim 1, wherein said stop devices are arranged around an axis of rotation of the hub at equal angular distances from one another.

11. The hub in accordance with claim 1, wherein said stop device comprises a ring.

12. The hub in accordance with claim 1, wherein said at least one guide device comprises a toothing in the form of a circle on an outer circumference of the hub, and wherein said stop device is attached without interfaces in a radially outer area of said at least one guide device.

13. The hub in accordance with claim 7, wherein said guide devices form a toothing in the form of a circle on an outer circumference of the hub, wherein said stop device is attached without interfaces in a radially outer area of each guide device.

14. The hub in accordance with claim 3, wherein said plurality of guide devices form a toothing in the form of a circle on an outer circumference of the hub, wherein at least one of said plurality of guide devices adjoins said at least one stop device in a radially outer area without interfaces.

* * * * *